Jan. 14, 1936.  L. J. CLAYTON  2,027,634
MACHINE FOR MOLDING HOLLOW RUBBER ARTICLES
Filed June 11, 1934    2 Sheets-Sheet 1
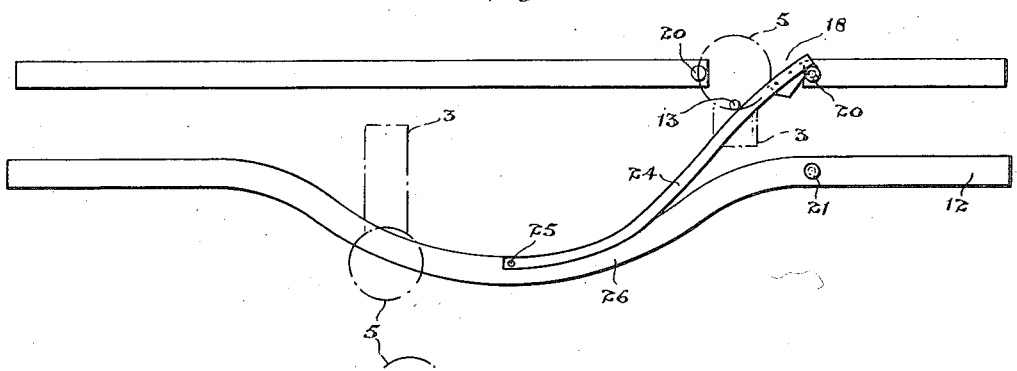
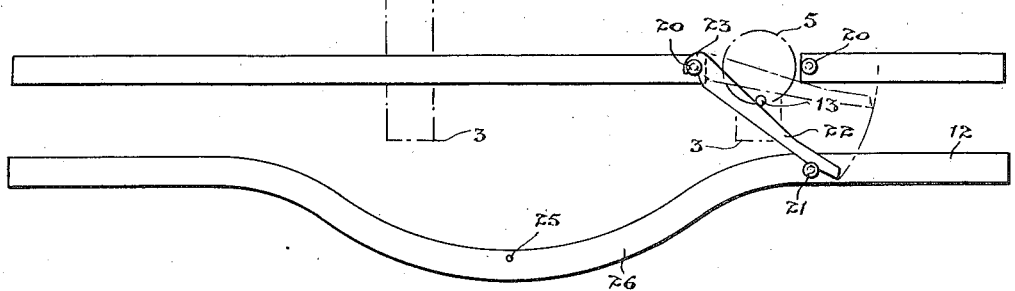
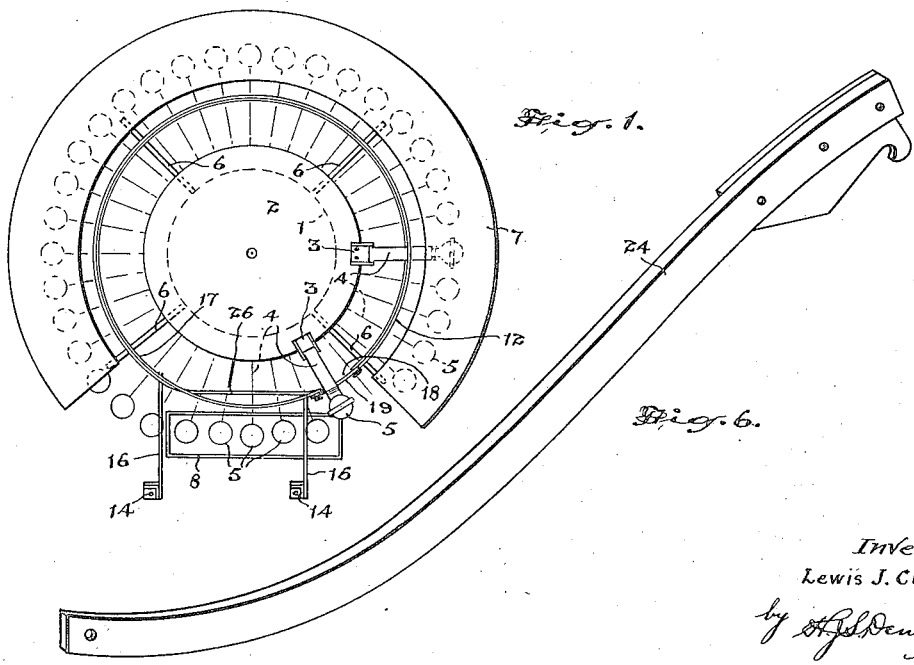
Inventor:
Lewis J. Clayton.

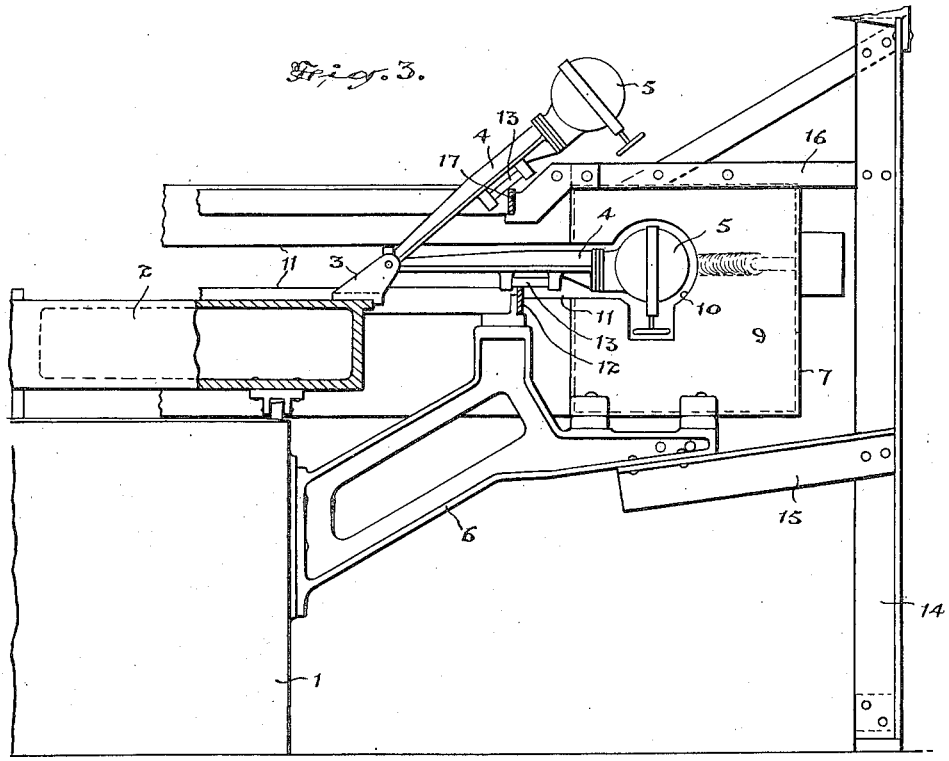
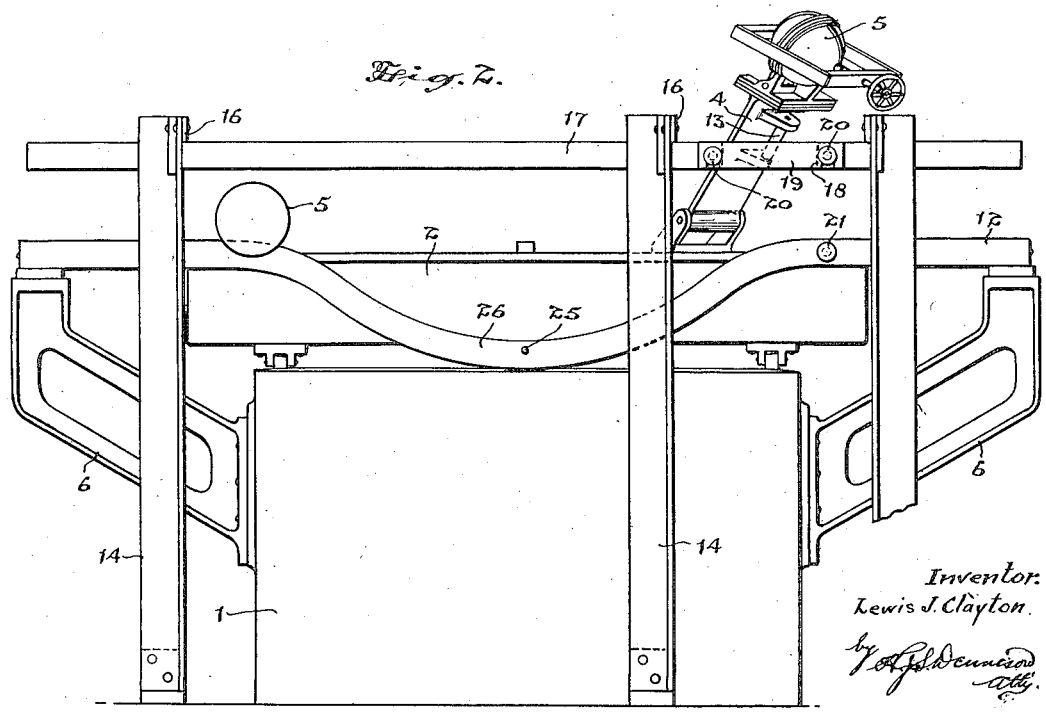

Patented Jan. 14, 1936

2,027,634

UNITED STATES PATENT OFFICE 2,027,634

MACHINE FOR MOLDING HOLLOW RUBBER ARTICLES

Lewis J. Clayton, Toronto, Ontario, Canada, assignor to Viceroy Manufacturing Company Limited, Toronto, Ontario, Canada Application June 11, 1934, Serial No. 729,999

5 Claims. (Cl. 18—6)

The principal objects of this invention are to facilitate the manufacture of hollow rubber articles by providing a machine which will effect a material economy in the use of power and which will materially increase the production of such goods, and which may be utilized for the production of various sizes and kinds of articles.

The principal feature of the invention consists in the novel construction and arrangement of a plurality of mold-carrying members carried by a rotatable member in association with an annular heating chamber and an arrangement of trackways for guiding the molds through the heat chamber or clear thereof, the trackways being provided with means for readily shifting molds to operate in the heat chamber or separate the molds selectively to be held in reserve.

In the accompanying drawings, Figure 1 is a diagrammatic plan view of a machine constructed in accordance with this invention illustrating the radial arrangement of molds carried by a central rotatable member and being supported by circumferential guides in or above an annular heat chamber.

Figure 2 is an enlarged elevational view showing the arrangement of the dual trackways, one mold-carrying arm being shown supported by the upper trackway.

Figure 3 is a further enlarged part sectional detail of a portion of the machine showing a mold positioned in the heat chamber and another mold in an elevated position above the heat chamber.

Figure 4 is an elevational detail view showing the arrangement of a switching member for selectively raising molds from the lower trackway to the upper one.

Figure 5 is an elevational detail similar to Figure 4 showing the means for switching to shift molds from the upper to the lower trackway.

Figure 6 is an enlarged detail of the switch arm illustrated in Figure 4.

In my former United States Patent No. 1,965,824, granted July 10, 1934. I have shown a centrally rotatable member carrying a plurality of mold-supporting arms in co-operation with an annular heating chamber heated by radiant electric heaters. The present invention is an improvement upon a machine of the class described in the aforesaid patent.

In the present structure a cylindrical base 1 has rotatably mounted thereon a circular member 2, upon the top of which are mounted a plurality of hinge brackets 3 arranged at the perimeter, and upon these hinge brackets are mounted the arms 4 which carry at the outer ends the molds 5 which are of a suitable design and construction preferably formed in half sections to be readily opened and closed.

A plurality of radial brackets 6 are rigidly secured to the vertical wall of the cylindrical base 1, and upon the outer ends of these brackets is mounted a heat chamber 7 which is here shown substantially rectangular in cross section and of angular form and having a sector face formed therein, between the ends of which is arranged a cooling trough 8 into which the molds are dipped.

The end closures 9 of the heat chamber are formed with openings 10 to permit the molds to enter and a slot 11 extends circumferentially around the inner wall.

A guide rail 12 is mounted on the brackets 6 and supports the arms 4 in a horizontal position so that they extend through the slot 11 into the heat chamber, said arms being provided with roller supports 13 to engage the guide rail.

A plurality of standards 14 are vertically arranged outside of the annular heat chamber, being supported in their vertical positions by the tie bars 15 secured to the brackets 6. Bracket arms 16 secured to the standards 14 extend inwardly over the top of the heat chamber 7 and support a circular guide rail 17 which is adapted to engage the roller supports 13 of the mold-carrying arm so that the arms rest in an inclined position as shown particularly in Figure 3, and when in this position the molds are arranged immediately above the heating chamber so that heat radiating from the chamber will heat the molds. This is an important feature of the invention for whenever it may be desired to use molds that have been held out of operation, that is, in the raised position above the heat chamber, they will be already heated and thus are immediately ready to receive the raw rubber blank which is to be molded.

The upper guide rail 17 is provided with a gap 18 and this gap is normally closed by a bar 19 which is notched and slipped over the studs 20 arranged adjacent to each end of the gap in the rail, the said bar completing the circular guide rail.

A stud 21 is mounted on the lower guide rail 12 immediately below one of the studs 20. When it is desired to lower one or more molds held out of active operation by the guide rail 17, it is merely necessary to lift the bar 19 and place the switch bar 22 in position with the hooked end 23 thereof engaging one of the studs 20, and the other end resting upon the stud 21 on the lower guide rail.

As the central member carrying the mold arms rotates the mold which it is desired to put into operation is allowed to run down the switch arm until the rollers engage the lower guide rail. The operator of the machine may lift any mold arm that he does not wish to be lowered over the gap or he may insert the bar 19 and allow the mold arms to roll thereover.

If at any time it is desired to remove certain of the molds out of operation the bar 19 is removed and the long curved switch bar 24 is hooked on to the stud 20 at one side of the opening in the upper guide rail and the lower end rests upon a stud 25 mounted on the downwardly curved section 26 of the guide rail 12. This switch bar picks up any of the mold arms which are to be transferred and guides them upwardly as the central member rotates so that they will roll upon the upper guide rail instead of the lower.

The construction of the device herein described is extremely simple, but it renders the machine very efficient.

In the manufacture of hollow rubber articles it is frequently found necessary to run a larger proportion of one size of goods than another, or it may be desired to run several sizes at once on the same machine. When therefore any one size has been completed there is no necessity for continuing the heating of the molds which are to be temporarily out of use and such molds are then switched to the upper guide rail, thus effecting a saving of heat in the heat chamber and also removing inactive molds out of the way of the operator who charges and discharges the molds.

As has previously been intimated the molds carried on the upper guide rail are not allowed to become cold. They are always connected to the operating device and are carried around therewith at a minimum of cost of operation, and when they are desired to be put into use, the metal thereof will already be heated so they may be swung down to co-operate with the lower guide rail and to run through the heat chamber from time to time as may be desired. Spare molds are therefore always available at an instant's notice. The device and a very efficient mechanism is provided.

What I claim as my invention is:—

1. In a machine for molding hollow rubber articles, the combination with a heat chamber slotted in one side, mold-carrying arms extending through the slot in said heat chamber and conveying the molds therein, and guide means supporting said arms in passage through said heat chamber, of a guide rail spaced above the means for guiding the mold-carrying arms with their operating position in the molds in the heating chamber, and means for optionally shifting said mold-carrying arms to and from the upper guide rail.

2. In a machine for molding hollow rubber articles, the combination with an annular form of heat chamber having a slot in one side to receive the mold-carrying arm pivotally mounted on a rotatable member, and a circular guide rail for supporting said mold-carrying arms in a horizontal position extending through the slot in said heat chamber, of a circular guide rail supported above the aforesaid guide rail and adapted to support the mold-carrying arms in an incline position with the molds arranged above the heat chamber, said upper rail having an opening therein, means for temporarily closing said opening, and switch means adapted to extend from said upper rail to the lower one to guide said arms from one rail to the other.

3. In a machine for molding hollow rubber articles, the combination with a base member, a heating chamber supported from said base member and extending in a circumferential path, a guide rail arranged between said base and said heating chamber, a rotatable member mounted on the base, and a plurality of pivotal mold-carrying arms mounted on the rotatable member, of a frame-work supported outside of said heating chamber and having inwardly extending brackets, a curved guide rail mounted on said inwardly extending brackets adapted to support the mold arms in an incline position with the molds positioned above the heat chamber, and means for switching the mold arms to rest upon either the upper or the lower of said guide rails.

4. In a machine for molding and curing rubber articles, the combination with a heat chamber, a plurality of travelling arms, and molds mounted thereon adapted to be normally carried through said heat chamber by the travel of said arms, said arms being individually displaceable to control the path of movement of said molds, of means for optionally displacing said arms during travel to divert said molds from their normal path of travel past said heat chamber on the outward side thereof to permit the continuous travel thereof and avoid subjection thereof to the curing temperature in said chamber.

5. In a machine for molding and curing rubber articles, the combination with a heat chamber, a plurality of radially disposed arms pivotally mounted and arranged to travel about a common center, and molds carried by said arms in a path normally extending through said heat chamber, of means for optionally swinging said arms on their pivotal mounting to divert the molds carried thereby clear of the heat chamber.

LEWIS J. CLAYTON.